US008831835B2

(12) United States Patent
Yoshimoto

(10) Patent No.: US 8,831,835 B2

(45) Date of Patent: Sep. 9, 2014

(54) STEERING SYSTEM

(71) Applicant: JTEKT Corporation, Osaka (JP)

(72) Inventor: Hiroshi Yoshimoto, Nara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/721,831

(22) Filed: Dec. 20, 2012

(65) Prior Publication Data

US 2013/0161118 A1 Jun. 27, 2013

(30) Foreign Application Priority Data

Dec. 26, 2011 (JP) ................................ 2011-283513

(51) Int. Cl.

*B62D 5/04* (2006.01)
*B62D 15/02* (2006.01)
*B62D 5/00* (2006.01)

(52) U.S. Cl.

CPC .............. *B62D 5/0403* (2013.01); *B62D 5/005* (2013.01); *B62D 5/001* (2013.01)

USPC ............................................... 701/43; 701/41

(58) Field of Classification Search

USPC ............. 701/41–43; 180/413–414, 444–446, 180/6.24, 6.28, 6.32; 74/30; 303/2; 445/66; 315/82; 388/833; 477/1; 37/416; 280/5.51

See application file for complete search history.

(56) References Cited

U.S. PATENT DOCUMENTS 5,538,037 A * 7/1996 Piz ao .......................... 137/556
7,664,584 B2 * 2/2010 Chino et al. .................... 701/41
2003/0146038 A1 8/2003 Mills et al.
2004/0013334 A1 1/2004 Landrieve et al.
2006/0107768 A1 * 5/2006 Johnson et al. .......... 73/862.628

FOREIGN PATENT DOCUMENTS

JP A-10-278826 10/1998
JP A-2001-114123 4/2001
WO WO 02/21006 A1 3/2002

OTHER PUBLICATIONS

Apr. 12, 2013 extended European Search Report issued in European Patent Application No. EP 12 19 8844.

* cited by examiner

*Primary Examiner* — John R Olszewski
*Assistant Examiner* — Tommy Worden
(74) *Attorney, Agent, or Firm* — Oliff PLC

(57) ABSTRACT

A steering system includes: an operation mechanism that includes an operation member; and a steered mechanism that is not mechanically coupled to the operation mechanism and that steers a wheel on the basis of a steering operation of the operation member. The operation mechanism includes a steering angle sensor that detects a steering angle of the operation member and a steering direction detection unit that detects a steering direction of the operation member. The steering direction detection unit includes a threaded shaft that is rotatable in the steering direction of the operation member, a nut that is screwed to the threaded shaft, a nut guide that causes the nut to move in an axial direction of the threaded shaft in accordance with rotation of the threaded shaft, and a force detection sensor that detects a force that the nut guide receives from the nut.

3 Claims, 3 Drawing Sheets

STEERING SYSTEM

INCORPORATION BY REFERENCE

The disclosure of Japanese Patent Application No. 2011-283513 filed on Dec. 26, 2011 including the specification, drawings and abstract, is incorporated herein by reference in its entirety.

BACKGROUND OF THE INVENTION

1. Field of the Invention

The invention relates to a steer-by-wire steering system.

2. Description of Related Art

In a vehicle steering system that is described in Japanese Patent Application Publication No. 2001-114123 (JP 2001-114123 A) as a steer-by-wire steering system, a rotating operation member and wheels are not mechanically coupled to each other. A steering actuator, which is controlled on the basis of a rotating operation amount of the rotating operation member, steers the wheels. In the above-described steer-by-wire steering system, a configuration for detecting the rotation of the rotating operation member is important. When a malfunction occurs in the above-described configuration, steering is disabled even if the steering actuator is properly operable. In the configuration for detecting the rotation of the rotating operation member, which is described in JP 2001-114123 A, only one angle sensor is provided. In a steering system described in Japanese Patent Application Publication No. 10-278826 (JP 10-278826 A), in order to increase the redundancy of the above-described configuration, a main steering angle sensor and a backup steering angle sensor are provided. Therefore, with the steering system described in JP 10-278826 A, even if a malfunction occurs in the main steering angle sensor, it is possible to continue steering with the use of the backup steering angle sensor.

In the steering system described in JP 10-278826 A, the two identical steering angle sensors are provided in order to make it possible to continue steering even if a malfunction occurs in one of the steering angle sensors. As a result, the number of components and the cost are unnecessarily increased.

SUMMARY OF THE INVENTION

It is an object of the invention to provide a steer-by-wire steering system with a configuration that allows continuation of steering even in the event of a malfunction in a steering angle sensor, and that is implemented without increases in the number of components and the cost.

An aspect of the invention relates to a steering system, including: an operation mechanism that includes an operation member used to perform a steering operation; and a steered mechanism that is not mechanically coupled to the operation mechanism, and that steers a wheel based on the steering operation of the operation member. The operation mechanism includes a steering angle sensor that detects a steering angle of the operation member and a steering direction detection unit that detects a steering direction of the operation member. The steering direction detection unit includes a threaded shaft that is rotatable in the steering direction of the operation member, a nut that is screwed to the threaded shaft, a nut guide that is a shaft member arranged parallel to the threaded shaft and passing through the nut and that causes the nut to move in an axial direction of the threaded shaft in accordance with rotation of the threaded shaft, and a force detection unit that detects a force that the nut guide receives from the nut.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
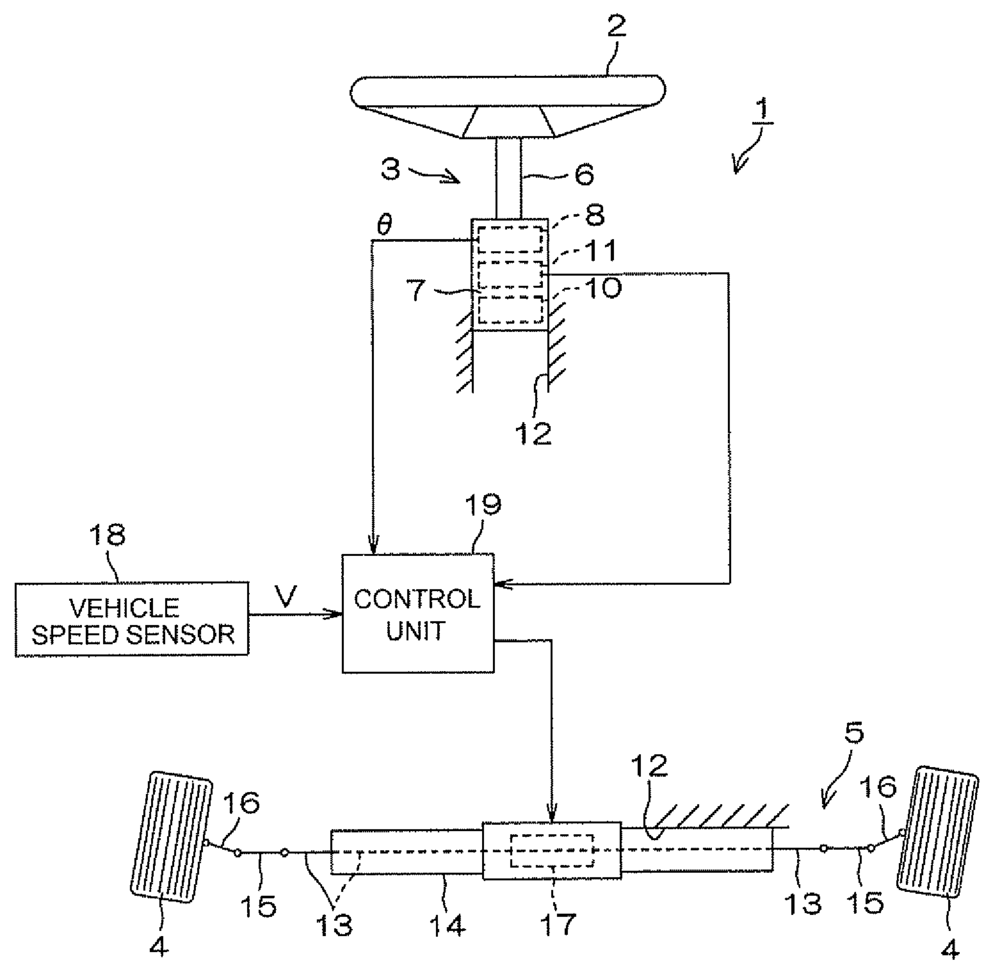
FIG. 1 is a schematic view that shows the schematic configuration of a steering system according to an embodiment of the invention.

An embodiment of the invention will be described with reference to the accompanying drawings. FIG. 1 is a schematic view that shows the schematic configuration of a steering system 1 according to an embodiment of the invention. As shown in FIG. 1, the steering system 1 is applied to a vehicle. The steering system 1 includes an operation mechanism 3 and a steered mechanism 5. The operation mechanism 3 includes a rotatable operation member 2, such as a steering wheel. The steered mechanism 5 steers wheels 4 in response to a steering operation of the operation member 2. The steering system 1 is a so-called steer-by-wire steering system, and the operation mechanism 3 and the steered mechanism 5 are not mechanically coupled to each other.

The operation mechanism 3 mainly includes a rotary shaft 6, a housing 7, a steering angle sensor 8, a reaction force generation unit 10, and a steering direction detection unit 11, in addition to the operation member 2. The rotary shaft 6 extends from the rotation center of the operation member 2. The rotary shaft 6 is rotatably supported by the housing 7. The steering direction detection unit 11 is an example of a steering direction detection unit. The rotary shaft 6 is fixed to the operation member 2. Thus, the operation member 2 and the rotary shaft 6 are rotatable together with each other about the central axis of the rotary shaft 6. Therefore, the angle by which the operation member 2 is rotated (which is referred to as “steering angle”) is equal to the rotation angle of the rotary shaft 6.

The housing 7 is a hollow cylindrical member that is fixed to a vehicle body 12, and part of the rotary shaft 6 (part on the opposite side of the rotary shaft 6 from the operation member 2) is accommodated in a hollow portion of the housing 7. The steering angle sensor 8 is, for example, a resolver, a rotary encoder, or the like, and detects the rotation angle of the rotary shaft 6 (i.e., the steering angle θ of the operation member 2). In this specification, the rotation angle (steering angle) is a vector that includes a rotation amount of the rotary shaft 6 and operation member 2 (an operation amount of the operation member 2) and a rotation direction of the rotary shaft 6 and operation member 2 (a steering direction of the operation member 2). The steering angle sensor 8 is accommodated in the housing 7.

The reaction force generation unit 10 applies resistance to the rotation of the rotary shaft 6 by rubbing against the rotary shaft 6. The resistance is applied to the operation member 2 as a steering reaction force. The steering reaction force applied to the operation member 2 allows a user who operates the operation member 2 to simulatively experience reaction force that the wheels 4 receive from a road surface. The reaction force generation unit 10 is accommodated in the housing 7. The steering direction detection unit 11 is used to detect the steering direction of the operation member 2, and will be described in detail later.

The steered mechanism 5 mainly includes a steered shaft 13, a housing 14, tie rods 15, knuckle arms 16 and a steered system actuator 17. The steered shaft 13 is a shaft member that extends in the width direction (vehicle width direction, and lateral direction in FIG. 1) of the vehicle body 12. The housing 14 is a hollow member that extends in the vehicle width direction, and the steered shaft 13 is passed through a hollow portion of the housing 14. In this state, both end portions of the steered shaft 13 in the axial direction (which coincides with the vehicle width direction) are exposed on the outside of the housing 14. The steered shaft 13 is slidable in the vehicle width direction.

Each of the tie rods 15 is coupled to a corresponding one of the axial end portions of the steered shaft 13. Each of the knuckle arms 16 is coupled to an end portion of a corresponding one of the tie rods 15 at a portion on the opposite side of the tie rod 15 from a portion coupled to the steered shaft 13. The wheels 4 are coupled to the respective knuckle arms 16. The steered system actuator 17 includes, for example, an electric motor (not shown) and a ball screw device (not shown). The ball screw device converts the driving force of the electric motor (the rotational force of an output shaft of the electric motor) into an axial sliding motion of the steered shaft 13. When the electric motor (not shown) of the steered system actuator 17 generates driving force, the steered shaft 13 slides in the vehicle width direction, The sliding motion is transmitted to the tie rods 15 at respective axial end portions of the steered shaft 13. As a result, the knuckle arms 16 pivot, and the wheels 4 are steered.

Although FIG. 1 shows a state where the wheels 4 are steered slightly to the right, the position (position in the rotation direction) of the operation member 2, which corresponds to the position of the wheels 4 at the time when the vehicle is travelling straight ahead, is the steering neutral position. The steering system 1 further includes a vehicle speed sensor 18 and a control unit 19. The vehicle speed sensor 18 detects a vehicle speed V. Detection signals from the steering angle sensor 8, the steering direction detection unit 11 and the vehicle speed sensor 18 are input into the control unit 19. The control unit 19 is also called an electronic control unit (ECU), and is formed of a microcomputer.

Figure 2:
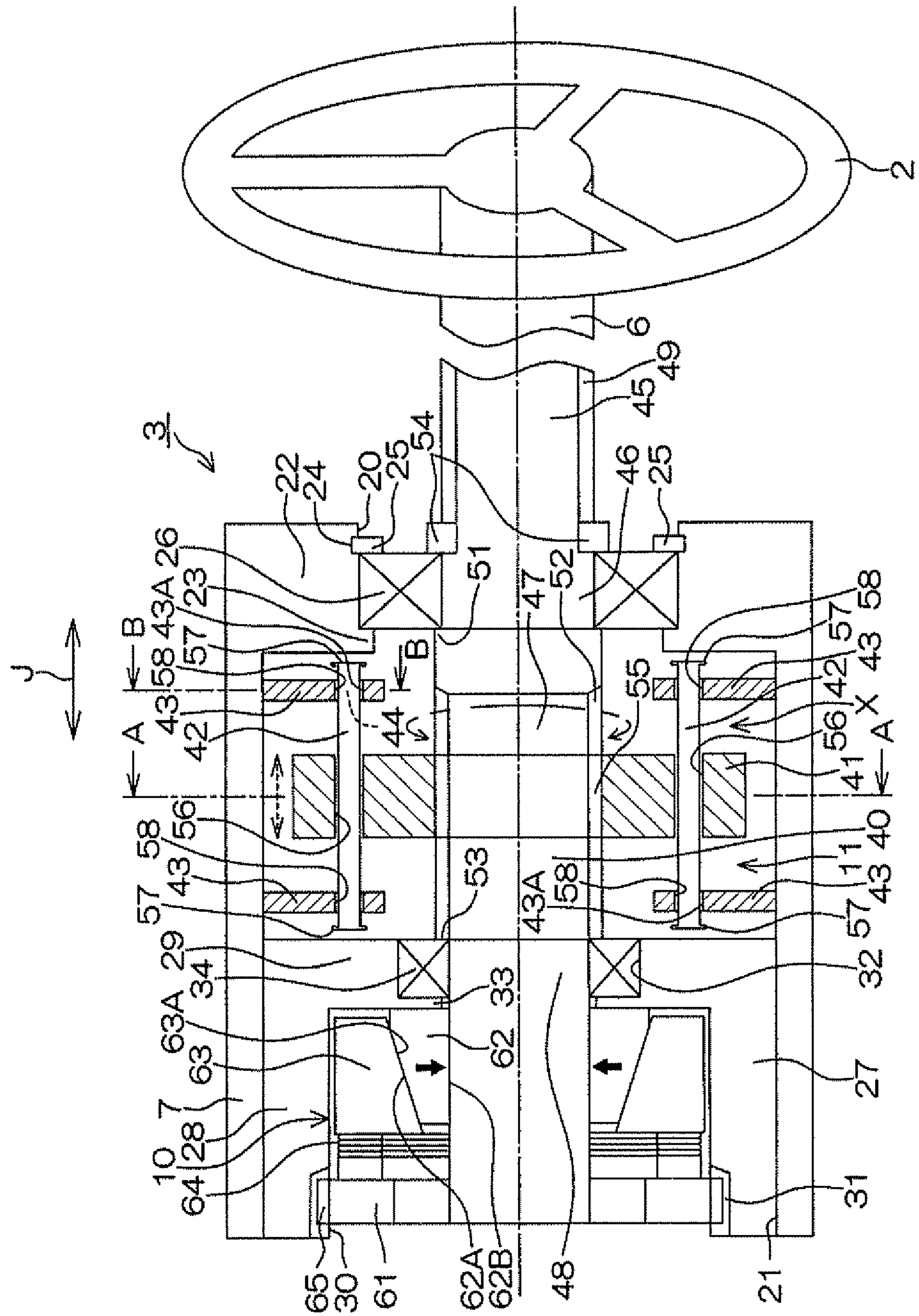
FIG. 2 is a schematic sectional view that shows an operation mechanism that is extracted from the steering system.
Figure 3A:
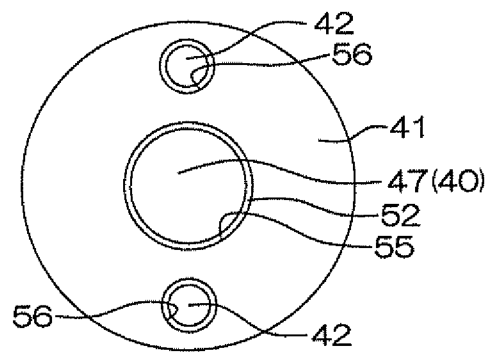
FIG. 3A is a sectional view taken along the line A-A in FIG. 2.
Figure 3B:
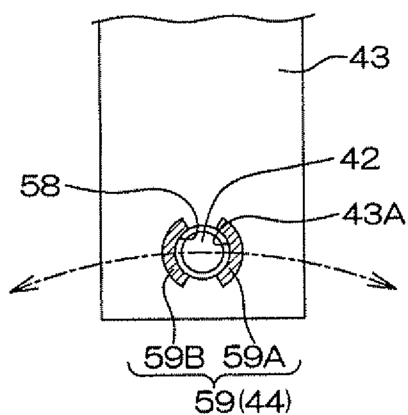
FIG. 3B is a sectional view taken along the line B-B in FIG. 2.

When the vehicle normally starts moving or is normally travelling, the control unit 19 sets a target steered angle on the basis of the steering angle θ detected by the steering angle sensor 8 and the vehicle speed V detected by the vehicle speed sensor 18, The control unit 19 executes drive control on the steered system actuator 17 such that the wheels 4 are steered to the target steered angle. FIG. 2 is a schematic sectional view that shows the operation mechanism 3 that is extracted from the steering system 1. FIG. 3A is a sectional view taken along the line A-A in FIG. 2. FIG. 3B is a sectional view that is taken along the line B-B in FIG. 2.

Next, the operation mechanism 3, particularly, the steering direction detection unit 11, will be described in detail with reference to FIG. 2, FIG. 3A and FIG. 3B. Note that, in FIG. 2, the steering angle sensor 8 is not shown. The following description will be provided on the assumption that the wheels 4 (see FIG. 1) are steered to the right when the operation member 2 shown in FIG. 2 is rotated in the clockwise direction and the wheels 4 are steered to the left when the operation member 2 is rotated in the counterclockwise direction.

In the operation mechanism 3, the above-described housing 7 extends in the lateral direction in FIG. 2. In the housing 7, a round first end opening 20 is formed in a first end face in the lateral direction (right end face in FIG. 2), and a round second end opening 21 is formed in a second end face in the lateral direction (left end face in FIG. 2). The hollow portion of the housing 7 communicates with the outside of the housing 7 via the first end opening 20 and the second end opening 21.

In the housing 7, a portion that defines the first end opening 20 is a flange 22 that forms a slightly thick annular plate. On the inner periphery of the flange 22, a positioning protrusion 23 that protrudes radially inward is formed integrally with the flange 22 at an end portion that is farthest from the outside of the housing 7 (a leftmost portion in FIG. 2). In addition, on the inner periphery of the flange 22, an annular groove 24 that is recessed radially outward and that extends along the whole circumference of the flange 22 is formed at an end portion that is closest to the outside of the housing 7 (a rightmost portion in FIG. 2). An annular or C-shaped positioning ring 25 is fitted into the annular groove 24 from the radially inner side. An annular bearing 26 is coaxially fitted to the first end opening 20. The bearing 26 is positioned with respect to the housing 7 by being held by the positioning protrusion 23 and the positioning ring 25 from respective sides.

A holder 27 is accommodated in the hollow portion of the housing 7 in a region on the opposite side from the flange 22. The holder 27 has a hollow cylindrical shape that is coaxial with the housing 7. A first axial end of the holder 27 is closed, and a second axial end of the holder 27 is open. The holder 27 has a cylindrical peripheral wall 28 and a disc-shaped end wall 29, which are formed integrally with each other and which are located in the housing 7. The cylindrical peripheral wall 28 has an outside diameter that is substantially equal to the inside diameter of a portion of the housing 7, other than the flange 22. The end wall 29 is coupled to a first axial end of the cylindrical peripheral wall 28.

The holder 27 is fitted into the housing 7 through the second end opening 21. The end wall 29 of the holder 27 is located closer to the first end opening 20 (right side in FIG. 2) of the housing 7 than the other portion of the holder 27. By connecting the outer periphery of the cylindrical peripheral wall 28 to the inner periphery of the housing 7, the holder 27 is fixedly coupled to the housing 7, and becomes part of the housing 7. An opening 30 is defined by a second axial end of the cylindrical peripheral wall 28, the second axial end being on the opposite side of the cylindrical peripheral wall 28 from a portion to which the end wall 29 is coupled. The opening 30 is located at the same position in an axial direction J (the axial direction of the housing 7 and the holder 27) as the second end opening 21 of the housing 7. The hollow portion of the holder 27 communicates with the outside of the housing 7 via the opening 30 and the second end opening 21. A threaded portion 31 is formed in the inner periphery of the cylindrical peripheral wall 28, in a region around the opening 30.

A round shaft insertion hole 32 is formed at the circle center position of the end wall 29. The round shaft insertion hole 32 passes through the end wall 29 in the thickness direction (axial direction J). A portion of the end wall 29, which defines the shaft insertion hole 32, forms the inner periphery of the end wall 29. On the inner periphery of the end wall 29, a positioning protrusion 33 that protrudes radially inward is formed integrally with the end wall 29, at an end portion on the opening 30 side (left end portion in FIG. 2). An annular bearing 34 is coaxially fitted into the shaft insertion hole 32. The bearing 34 is positioned with respect to the housing 7 by bringing the positioning protrusion 33 into contact with the bearing 34 from the opening 30 side (left side in FIG. 2).

The steering direction detection unit 11 includes a threaded shaft 40, a nut 41, nut guides 42, stoppers 43 and a force detection sensor 44 (see FIG. 3B) that may function as a force detection unit. The threaded shaft 40 is a shaft member, and is coaxially coupled to the rotary shaft 6. The threaded shaft 40 and the rotary shaft 6 may be formed integrally with each other or may be formed so as to be detachable from each other. The threaded shaft 40 has a first thread forming portion 45, a first support portion 46, a second thread forming portion 47 and a second support portion 48, which are formed integrally with each other and arranged in this order from the rotary shaft 6 side.

A threaded portion 49 is formed on the outer periphery of the first thread forming portion 45. The outer periphery of the first support portion 46 is an even peripheral face. The first support portion 46 has substantially the same diameter as the first thread forming portion 45. The second thread forming portion 47 is slightly larger in diameter than the first support portion 46. Therefore, a step 51 is formed at an end portion of the second thread forming portion 47, the end portion being adjacent to the first support portion 46. A threaded portion 52 is formed on the outer periphery of the second thread forming portion 47. Note that the threaded portion 52 need not be formed all over the outer periphery of the second thread forming portion 47. In FIG. 2, no threaded portion 52 is formed in a region near the step 51, on the outer periphery of the second thread forming portion 47.

The outer periphery of the second support portion 48 is an even peripheral face. The second support portion 48 is slightly smaller in diameter than the second thread forming portion 47. Therefore, a step 53 is formed at an end portion of the second thread forming portion 47, the end portion being adjacent to the second support portion 48. The threaded shaft 40 is partially accommodated in the housing 7 in a state where the threaded shaft 40 is passed through the first end opening 20 and the second end opening 21 of the housing 7. In addition, the threaded shaft 40 is partially accommodated in the holder 27 in a state where the threaded shaft 40 is passed through the opening 30 and the shaft insertion hole 32 inside the housing 7. At this time, the threaded shaft 40 is coaxial with each of the housing 7 and the holder 27. Therefore, the axial direction of the threaded shaft 40 (rotary shaft 6) is the same as the above-described axial direction J.

In the threaded shaft 40, a major portion (portion other than an end portion on the first, support portion 46 side) of the first thread forming portion 45 protrudes from the first end opening 20 to the outside of the housing 7. The threaded shaft 40 is connected to the rotary shaft 6. The first support portion 46 is fitted to the inner periphery of the above-described bearing 26. An annular positioning nut 54 is screwed to the threaded portion 49 of the first thread forming portion 45 from the radially outer side. The positioning nut 54 is in contact with the bearing 26 from the outer side of the housing 7. The positioning nut 54 may be regarded as part of the threaded shaft 40. The bearing 26 is positioned with respect to the threaded shaft 40 by being held by the positioning nut 54 and the step 51 from respective sides in the axial direction J.

In the threaded shaft 40, the second thread forming portion 47 is arranged in a region (referred to as "detection region") X between the flange 22 and the end wall 29 of the holder 27 in the hollow portion of the housing 7. The second support portion 48 is arranged in the hollow portion of the holder 27.

An end portion of the second support portion 48, which is on the second thread forming portion 47 side, is fitted to the inner periphery of the above-described bearing 34. The bearing 34 is positioned with respect to the threaded shaft 40 by being held by the step 53 of the second thread forming portion 47, which is on the second support portion 48 side, and the positioning protrusion 33 of the end wall 29 of the holder 27 from respective sides in the axial direction J.

The threaded shaft 40 is rotatably supported by the housing (including the holder 27) at two portions in the axial direction J, at which the bearing 26 and the bearing 34 are positioned. Because the threaded shaft 40 is connected to the operation member 2 via the rotary shaft 6, the rotation direction (see the long dashed short dashed line in FIG. 2) of the threaded shaft 40 is the same as the steering direction of the operation member 2. That is, the threaded shaft 40 is rotatable in the steering direction of the operation member 2. The steering angle θ (see FIG. 1) of the operation member 2 is equal to the rotation angle of the threaded shaft 40.

The above-described reaction force generation unit 10 will be described before describing the nut 41, the nut guides 42, the stoppers 43 and the force detection sensor 44. The reaction force generation unit 10 is accommodated in the holder 27. The reaction force generation unit 10 includes an annular plug 61, an annular rubbing ring 62, an annular pressing ring 63 and a spring 64. The plug 61 surrounds the second support portion 48 of the threaded shaft 40 in a non-contact state. The rubbing ring 62 is fitted onto the second support portion 48, at a position closer to the end wall 29 than the plug 61. The pressing ring 63 is fitted onto the rubbing ring 62. The spring 64 is interposed between the plug 61 and the pressing ring 63 in a compressed state.

A threaded portion 65 is formed on the outer periphery of the plug 61, and the threaded portion 65 is screwed to the threaded portion 31 of the holder 27 from the radially inner side, An outer periphery 62A of the rubbing ring 62 and an inner periphery 63A of the pressing ring 63 both are conical surfaces that increase in diameter in a direction away from the plug 61 (rightward in FIG. 2), and are in surface contact with each other. The pressing ring 63 is urged by the spring 64 in a direction away from the plug 61, and presses the rubbing ring 62 radially inward, at its inner periphery 63A. Thus, as indicated by the wide line arrows, the rubbing ring 62 is reduced in diameter, and an inner periphery 62B of the rubbing ring 62 is pressed against the second support portion 48 of the threaded shaft 40. When the threaded shaft 40 is rotated due to a steering operation of the operation member 2, friction between the second support portion 48 and the inner periphery 62B of the rubbing ring 62 is applied to the operation member 2 as the above-described steering reaction force. When the plug 61 is screwed in toward the pressing ring 63, the urging force of the spring 64 increases. Accordingly, friction between the second support portion 48 and the inner periphery 62B of the rubbing ring 62 increases, and steering reaction force also increases. In this way, it is possible to adjust the steering reaction force on the basis of the screw-in amount of the plug 61.

The nut 41 is an annular member. In FIG. 2, for the sake of easy illustration, a portion corresponding to the cross section of the nut 41 is indicated by the positive-slope hatching. A threaded portion 55 is formed in the inner periphery of the nut 41. A round insertion hole 56 is formed in the nut 41. The insertion hole 56 passes through the nut 41 in its axial direction (thickness direction). A single insertion hole 56 or a plurality of (two in the present embodiment) insertion holes 56 is formed. When a plurality of the insertion holes 56 is formed, the insertion holes 56 are formed at equal intervals in the circumferential direction (see FIG. 3A). The nut 41 is arranged in the above-described detection region X, and is fitted onto the second thread forming portion 47 of the threaded shaft 40. At this time, the threaded portion 55 of the nut 41 is screwed to the threaded portion 52 of the second thread forming portion 47. That is, the nut 41 is screwed to the threaded shaft 40, and is coaxial with the threaded shaft 40. Therefore, the axial direction of the nut 41 coincides with the above-described axial direction J.

Nut guides 42 are shaft members, and the number of the nut guides 42 is the same as the number (two, in the present embodiment) of the insertion holes 56 of the nut 41. In each nut guide 42, retaining flanges 57 are formed integrally with respective end portions in the axial direction (which is also the longitudinal direction of each nut guide 42). Each retaining flange 57 projects radially outward of the nut guide 42. The nut guides 42 are arranged parallel to the second thread forming portion 47 of the threaded shaft 40 in the detection region X, and are passed through the respective insertion holes 56 of the nut 41. That is, each nut guide 42 (more specifically, a portion between the retaining flanges 57 at respective ends) passes through the nut 41 in a corresponding one of the insertion holes 56.

The stoppers 43 each are a plate-like member that extends along the radial direction of the housing 7, and are fixed to the inner periphery of the housing 7 in the detection region X. The stoppers 43 extend from the inner periphery toward the second thread forming portion 47 of the threaded shaft 40. The stoppers 43 are provided on respective axial sides of the nut 41. In each stopper 43, a round retaining hole 58 that passes through the stopper 43 in the axial direction J is formed at a position that overlaps with the corresponding insertion hole 56 of the nut 41 when viewed in the axial direction J. Note that, in FIG. 2, for the sake of easy illustration, a portion that corresponds to the cross section of each stopper 43 is indicated by the negative-slope hatching.

In FIG. 2, the two stoppers 43 located at the same position in the axial direction J (the upper and lower two stoppers 43 on each of both sides of the nut 41 in the axial direction J) may be integrated as part of an annular member that surrounds the second thread forming portion 47 in a non-contact state or may be separate members. In the present embodiment, the two stoppers 43 located at the same position in the axial direction J are separate members that are independent from each other (see FIG. 3B). More specifically, in the present embodiment, the elongate plate-like stoppers 43 (see FIG. 3B) are arranged on respective sides of each of the two insertion holes 56 of the nut 41 in the axial direction J. The number of the stoppers 43 is four in total.

The nut guides 42 passed through the respective insertion holes 56 of the nut 41 are also passed through the retaining holes 58 of the stoppers 43 located on respective sides of the insertion holes 56 in the axial direction J. That is, the stoppers 43 are provided at respective ends of each nut guide 42 in the longitudinal direction (which coincides with the axial direction J), and serve as retaining members that retain a first end portion and a second end portion of each nut guide 42 in the longitudinal direction. Each of the retaining flanges 57 at respective ends of each nut guide 42 protrudes from a face of a corresponding one of the stoppers 43, the face being on the opposite side of the stopper 43 from the nut 41. Therefore, each nut guide 42 does not slip off from the retaining holes 58 of the stoppers 43, and is maintained in a state where each nut guide 42 is passed through the insertion hole 56 of the nut 41 and the retaining holes 58 of the stoppers 43 on respective sides of the nut 41.

In the present embodiment, each nut guide 42 is passed through each of the insertion hole 56 and the retaining holes 58 with a slight play. In other words, each nut guide 42 is loosely fitted in each of the insertion hole 56 and the retaining holes 58. As shown in FIG. 3B, the force detection sensor 44 includes strain sensors (strain gauges) 59. The strain sensors 59 are provided in at least one of the retaining holes 58 of the stoppers 43 (provided in one of the retaining holes 58, in the present embodiment). More specifically, the strain sensors 59 are provided in respective regions (see hatched portions) on respective sides of the nut guide 42 in the rotation direction (see the long dashed short dashed line arrow) of the threaded shaft 40 on an inner periphery 43A that defines the retaining hole 58 of the stopper 43. That is, the force detection sensor 44 includes a pair of the strain sensors 59 that are arranged along the rotation direction of the threaded shaft 40 so as to face each other, and the strain sensors 59 are provided on the inner periphery 43A that defines the corresponding retaining hole 58.

From among the strain sensors 59, the strain sensor 59 at one side in the rotation direction of the threaded shaft 40 (in other words, the operation member 2) (right side in FIG. 3B, and the side to which the operation member 2 is rotated in the clockwise direction) with respect to the nut guide 42 will be referred to as "first strain sensor 59A". From among the strain sensors 59, the strain sensor 59 at the other side in the rotation direction of the threaded shaft 40 (left side in FIG. 3B, and the side to which the operation member 2 is rotated in the counterclockwise direction) will be referred to as "second strain sensor 59B".

Figure 4:
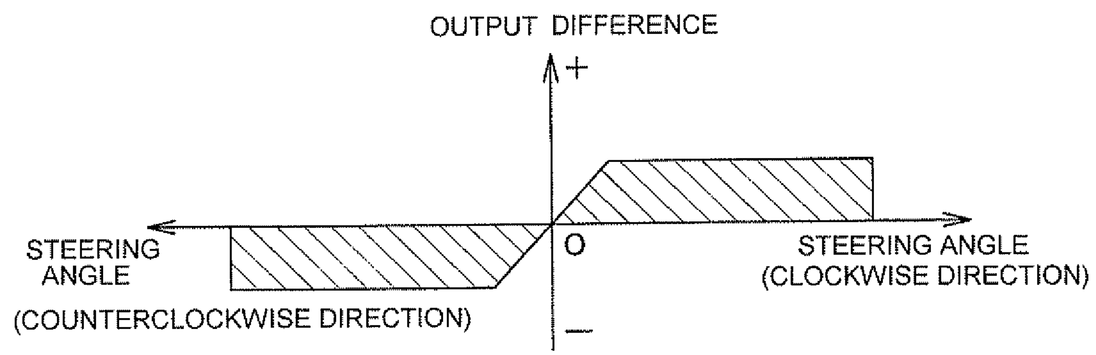
FIG. 4 is a graph that shows detection results output from strain sensors.

FIG. 4 is a graph that shows detection results output from the strain sensors 59. The first strain sensor 59A detects a strain (a value of strain) of a peripheral portion of the first strain sensor 59A, the peripheral portion being on the inner periphery 43A, when the nut guide 42 contacts the portion and the portion is distorted. The second strain sensor 59B detects a strain of a peripheral portion of the second strain sensor 598, the peripheral portion being on the inner periphery 43A, when the nut guide 42 contacts the portion and the portion is distorted. When a value obtained by subtracting the strain detected by the second strain sensor 59B from the strain detected by the first strain sensor 59A is defined as "output difference", if the nut guide 42 strongly contacts the first strain sensor 59A on the inner periphery 43A, the output difference is a positive value; whereas, if the nut guide 42 strongly contacts the second strain sensor 59B on the inner periphery 43A, the output difference is a negative value (see FIG. 4). The force detection sensor 44 that includes the strain sensors 59 detects the output difference.

As shown in FIG. 2, when the user steers the operation member 2 to rotate the operation member 2 in the clockwise direction or the counterclockwise direction, the rotary shaft 6 and the threaded shaft 40 also rotate together with the operation member 2. At this time, the nut 41 screwed to the threaded shaft 40 attempts to rotate together with the threaded shaft 40. However, the nut 41 is not able to rotate because the nut guides 42 are passed through the respective insertion holes 56 of the nut 41, and the nut 41 slides along the nut guides 42 (in other words, the axial direction J of the threaded shaft 40) instead of rotating. That is, the nut guides 42 cause the nut 41 to move in the axial direction J of the threaded shaft 40 as the threaded shaft 40 rotates.

For example, when the user rotates the operation member 2 (in other words, the threaded shaft 40) in the clockwise direction in FIG. 2, the nut 41 slides along the nut guides 42 in a direction toward the operation member 2 (right side in FIG. 2). At this time, the nut guides 42 that restrict the rotation of the nut 41 receive clockwise force from the nut 41, and the clockwise force acts on the stoppers 43 in which the nut guides 42 are passed through the retaining holes 58. Therefore, the nut guide 42 strongly contacts the first strain sensor 59A on the clockwise side on the inner periphery 43A of the stopper 43 (see FIG. 3B). Therefore, the output difference is a positive value (see FIG. 4).

When the operation member 2 is continuously rotated in the same direction and, finally, the nut 41 contacts the stoppers 43 which are closest to the operation member 2 (on the right side in FIG. 2), the nut 41 is not able to slide any more, and the operation member 2 is not allowed to be rotated in the same direction (clockwise direction) any more. That is, the right-side stoppers 43 in FIG. 2 prevent movement of the nut 41 in the axial direction J (rightward) beyond a predetermined position at which the nut 41 contacts the stoppers 43, thereby notifying the user of a steering end of the operation member 2 in the case where the operation member 2 is rotated in the clockwise direction.

On the other hand, when the user rotates the operation member 2 in the counterclockwise direction in FIG. 2, the nut 41 slides in a direction away from the operation member 2 (leftward in FIG. 2) along the nut guides 42. At this time, the nut guides 42 that restrict the rotation of the nut 41 receive counterclockwise force from the nut 41, and the counterclockwise force also acts on the stoppers 43 in which the nut guides 42 are passed through the retaining holes 58. Therefore, the nut guide 42 strongly contacts the second strain sensor 59B on the counterclockwise side on the inner periphery 43A of the stopper 43 (see FIG. 3B). Therefore, the output difference is a negative value (see FIG. 4).

When the operation member 2 is continuously rotated in the same direction and, finally, the nut 41 contacts the stoppers 43 which are farthest from the operation member 2 (on the left side in FIG. 2), the nut 41 is not able to slide any more, and the operation member 2 is not allowed to be rotated in the same direction (counterclockwise direction) any more. That is, the left-side stoppers 43 in FIG. 2 prevent movement of the nut 41 in the axial direction J (leftward) beyond a predetermined position at which the nut 41 contacts the stoppers 43, thereby notifying the user of a steering end of the operation member 2 in the case where the operation member 2 is rotated in the counterclockwise direction.

As described above, the force detection sensor 44 (see FIG. 3B) that includes the first strain sensor 59A and the second strain sensor 59B indirectly detects a force that the nut guide 42 receives from the nut 41, by detecting the above-described output difference, and also detects the direction (the above-described clockwise direction or counterclockwise direction) of the force that the nut guide 42 applies to the stopper 43. The output difference detected by the force detection sensor 44 is input into the control unit 19 (see FIG. 1). On the basis of the output difference that is input into the control unit 19, the control unit 19 determines that the steering direction of the operation member 2 is the clockwise direction in FIG. 2 when the output difference is a positive value, and determines that the steering direction of the operation member 2 is the counterclockwise direction in FIG. 2 when the output difference is a negative value. In this way, not only the steering angle θ (see FIG. 1) detected by the steering angle sensor 8 but also the output difference (the steering direction of the operation member 2) detected by the force detection sensor 44 is input into the control unit 19.

As shown in FIG. 1, for example, when a malfunction occurs in the steering angle sensor 8, a detection result (steering angle θ) from the steering angle sensor 8 is not input into the control unit 19. In this case, the control unit 19 acquires the steering direction in which the operation member 2 is operated by the user, on the basis of the output difference received from the force detection sensor 44 (see FIG. 3B) of the steering direction detection unit 11. When the output difference is a positive value (when the steering direction of the operation member 2 is the clockwise direction), drive control is executed on the steered system actuator 17 such that the wheels 4 are steered to the right by a predetermined angle and at a predetermined speed within a period during which the output difference is a positive value or within a predetermined period from when the output difference becomes a positive value. On the other hand, when the output difference is a negative value (when the steering direction of the operation member 2 is the counterclockwise direction), drive control is executed on the steered system actuator 17 such that the wheels 4 are steered to the left by a predetermined angle and at a predetermined speed within a period during which the output difference is a negative value or within a predetermined period from when the output difference becomes a negative value.

As described above, in the steer-by-wire steering system 1, it is possible not only to detect the steering angle θ of the operation member 2 with the use of the steering angle sensor 8 but also to detect the steering direction of the operation member 2 with the use of the steering direction detection unit 11. Therefore, even if a malfunction occurs in the steering angle sensor 8, the steered mechanism 5 is able to steer the wheels 4 on the basis of the steering direction detected by the steering direction detection unit 11 that serves as a fail-safe mechanism. That is, the steering system 1 allows at least continuation of steering even if a malfunction occurs in the steering angle sensor 8, although the accuracy is lower than that when the steering angle sensor 8 is operating normally.

As shown in FIG. 2, the steering direction detection unit 11 that detects only the steering direction has a low-cost and simple configuration that includes the threaded shaft 40, the nut 41, the nut guides 42 and the force detection sensor 44. The steering direction detection unit 11 is able to detect the steering direction of the operation member 2 on the basis of the force that the nut guide 42 receives from the nut 41 at the time when the nut 41 moves along the axial direction J of the threaded shaft 40 in response to a steering operation of the operation member 2 (rotation of the threaded shaft 40). By using the thus configured steering direction detection unit 11, it is possible to suppress increases in the number of components and the cost in comparison with the case where the steering angle sensor 8 (see FIG. 1) that detects the steering angle (both the steering direction and the steering amount) of the operation member 2 is additionally provided instead of the steering direction detection unit 11.

That is, the configuration that allows continuation of steering even if a malfunction occurs in the steering angle sensor 8 is implemented without increases in the number of components and the cost, and it is possible to ensure the redundancy of the steering system 1. Particularly, even when the steering direction detection unit 11 is added to the existing operation mechanism 3, it is possible to avoid a significant design change in the operation mechanism 3. Therefore, it is possible to reliably avoid increases in the number of components and the cost. In addition, the force detection sensor 44 shown in FIG. 3B is able to indirectly detect a force that the nut guide 42 receives from the nut 41 on the basis of the direction of force (force that the nut guide 42 applies to the stopper 43) detected by the strain sensors 59. It is possible to simply form the force detection sensor 44 from the strain sensors 59. Thus, it is possible to implement the configuration that allows continuation of steering even if a malfunction occurs in the steering angle sensor 8, while further reliably avoiding increases in the number of components and the cost.

Because the nut guide 42 is passed through the retaining hole 58 in which the strain sensors 59 is provided, it is possible to highly accurately detect the direction of force that the nut guide 42 applies to a retaining member (stopper 43) that has the retaining hole 58, with the use of the strain sensors 59. In addition, by providing the strain sensors 59 on the inner periphery 43A that defines the retaining hole 58, it is possible to simply form the force detection sensor 44. Thus, it is possible to implement the configuration that allows continuation of steering even if a malfunction occurs in the steering angle sensor 8, while further reliably avoiding increases in the number of components and the cost.

The invention is not limited to the above-described embodiment and various modifications may be made within the scope of the appended claims. For example, in the above-described embodiment, the stoppers 43 are provided at both end portions of each nut guide 42 in the longitudinal direction. Therefore, the steering direction detection unit 11 is able to detect each of the steering directions, that is, the clockwise direction and counterclockwise direction of the operation member 2 (see FIG. 2). However, if it is necessary to detect only one of the steering directions, the stopper 43 need to be provided at only the first end portion or the second end portion of each nut guide 42 in the longitudinal direction.

A pressure-sensitive sensor formed of a piezoelectric element, or the like, may be used as the force detection sensor 44 instead of the strain sensors 59. The force detection sensor 44 may be provided at a portion of one of the nut guides 42, which is accommodated in the corresponding insertion hole 56 of the nut 41 instead of being provided at the stopper 43. In this case, the force detection sensor 44 is able to directly detect a force that the nut guide 42 receives from the nut 41.

What is claimed is:

1. A steering system, comprising:

an operation mechanism that includes an operation member used to perform a steering operation; and a steered mechanism that is not mechanically coupled to the operation mechanism, and that steers a wheel based on the steering operation of the operation member, wherein the operation mechanism includes a steering angle sensor that detects a steering angle of the operation member and a steering direction detection unit that detects a steering direction of the operation member, and the steering direction detection unit includes:

a threaded shaft that is rotatable in the steering direction of the operation member, a nut that is screwed to the threaded shaft, the nut including an insertion hole that passes through the nut in the axial direction, a nut guide that is a shaft member extending in an axial direction of the threaded shaft, the nut guide being arranged parallel to the threaded shaft and passing through the insertion hole, and the nut guide causing the nut to move in the axial direction of the threaded shaft in accordance with rotation of the threaded shaft, and a force detection unit that detects a force that is applied to the nut guide in a circumferential direction of the threaded shaft from the nut.

2. The steering system according to claim 1, further comprising:

a stopper that is provided at at least one end portion of the nut guide in a longitudinal direction of the nut guide and that prevents movement of the nut in the axial direction beyond a predetermined position, wherein the force detection unit includes a pair of strain sensors that are used to detect a direction of a reaction force that the nut guide applies to the stopper.

3. The steering system according to claim 2, wherein:

the stopper is provided at each of both end portions of the nut guide in the longitudinal direction, and the stoppers also serve as retaining members that respectively retain the one end portion and the other end portion of the nut guide;

each of the retaining members has a retaining hole through which the nut guide is passed; and the pair of strain sensors are provided on at least one of inner peripheries of the retaining members, which define the retaining holes.

* * * * *